(12) United States Patent
Awad et al.

(10) Patent No.: US 9,319,221 B1
(45) Date of Patent: Apr. 19, 2016

(54) CONTROLLING ACCESS BASED ON RECOGNITION OF A USER (71) Applicant: Amazon Technologies, Inc., Reno, NV (US)

(72) Inventors: Nadim Awad, San Francisco, CA (US); Jonathan White Keljo, Seattle, WA (US); Levon Dolbakian, Los Gatos, CA (US); Arnaud Marie Froment, San Jose, CA (US); Kenneth Paul Kiraly, Menlo Park, CA (US); Michael David Dumont, Sunnyvale, CA (US); Srinivasan Sridharan, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 21 days.

(21) Appl. No.: 13/898,380

(22) Filed: May 20, 2013

(51) Int. Cl.
H04L 29/06 (2006.01)
H04L 9/32 (2006.01)

(52) U.S. Cl.
CPC .................................. H04L 9/3231 (2013.01)

(58) Field of Classification Search
CPC ..................................................... H04L 9/3231
USPC ..................................... 713/186, 166; 726/30
See application file for complete search history.

(56) References Cited

U.S. PATENT DOCUMENTS

| 5,805,674 | A  | * | 9/1998 | Anderson, Jr. | ........ H04W 12/12 379/111 |
| 6,160,903 | A  | * | 12/2000 | Hamid | ............... G07C 9/00158 382/115 |
| 7,289,563 | B2 | * | 10/2007 | Yamamoto | ............. H04N 7/181 348/143 |
| 8,193,904 | B2 | * | 6/2012 | Kawakita | ........... G07C 9/00158 340/426.1 |
| 8,341,408 | B2 | * | 12/2012 | Kumoluyi | ............. H04L 63/105 713/166 |
| 8,462,949 | B2 | * | 6/2013 | Anderson | ............... G06F 21/84 345/204 |
| 2003/0054800 | A1 | * | 3/2003 | Miyashita | ............... H04M 1/67 455/411 |
| 2004/0145657 | A1 | * | 7/2004 | Yamamoto | ............. H04N 7/181 348/143 |
| 2006/0174319 | A1 | * | 8/2006 | Kraemer | .................. G06F 21/53 726/1 |
| 2007/0094711 | A1 | * | 4/2007 | Corley | .................... G06F 21/53 726/3 |
| 2007/0263085 | A1 | * | 11/2007 | Marton | ................... H04N 7/147 348/14.09 |
| 2008/0091453 | A1 | * | 4/2008 | Meehan | ............... G06Q 20/341 705/317 |
| 2008/0235771 | A1 | * | 9/2008 | Corley | .................... G06F 21/53 726/4 |
| 2009/0141895 | A1 | * | 6/2009 | Anderson | ............... G06F 21/84 380/252 |
| 2010/0045424 | A1 | * | 2/2010 | Kawakita | ........... G07C 9/00158 340/5.2 |

(Continued)

Primary Examiner — David Garcia Cervetti
(74) Attorney, Agent, or Firm — Novak Druce Connolly Bove + Quigg LLP (57) ABSTRACT Approaches to enable a computing device, such as a phone or tablet computer, to compute a probability that the user currently using the device matches a profile of an authorized user and to set or change a security level of the computing device based on the computed probability. The security level can be one of many security levels each having a different scope of authorized access to data or functions of the computing device. The computing device may periodically re-compute the probability and change the security level whenever the probability crosses certain predefined thresholds.

21 Claims, 7 Drawing Sheets

(56) References Cited

U.S. PATENT DOCUMENTS

| | | | |
|---|---|---|---|
| 2010/0225947 A1* | 9/2010 | Yoshida | G06F 21/35 358/1.13 |
| 2011/0007156 A1* | 1/2011 | Sankaranarayanan | G08B 25/008 348/143 |
| 2011/0035788 A1* | 2/2011 | White | G06F 21/32 726/4 |
| 2011/0231911 A1* | 9/2011 | White | G06F 21/32 726/7 |
| 2011/0314530 A1* | 12/2011 | Donaldson | G06F 21/83 726/7 |
| 2012/0128158 A1* | 5/2012 | Kumoluyi | H04L 63/105 380/270 |
| 2012/0154413 A1* | 6/2012 | Kim | H04M 1/72563 345/530 |
| 2012/0157165 A1* | 6/2012 | Kim | G06F 21/6218 455/566 |
| 2012/0159139 A1* | 6/2012 | Kim | H04M 1/72563 713/2 |
| 2013/0036309 A1* | 2/2013 | Kevenaar | G06F 21/32 713/186 |
| 2013/0074195 A1* | 3/2013 | Johnston | H04L 51/34 726/28 |
| 2013/0091564 A1* | 4/2013 | Fitzgerald | G06F 21/88 726/17 |
| 2013/0191481 A1* | 7/2013 | Prevost | H04L 12/1859 709/206 |
| 2013/0198832 A1* | 8/2013 | Draluk | G06F 21/31 726/16 |
| 2013/0339018 A1* | 12/2013 | Scheffer | G10L 17/22 704/236 |
| 2014/0013437 A1* | 1/2014 | Anderson | G06F 21/84 726/26 |
| 2014/0157401 A1* | 6/2014 | Alameh | G06F 21/45 726/17 |
| 2014/0187200 A1* | 7/2014 | Reitter | H04W 4/021 455/410 |
| 2014/0189799 A1* | 7/2014 | Lu | H04L 63/08 726/4 |
| 2014/0189829 A1* | 7/2014 | McLachlan | G06Q 20/4014 726/6 |
| 2014/0254778 A1* | 9/2014 | Zeppenfeld | H04M 3/523 379/88.02 |
| 2014/0282893 A1* | 9/2014 | Sheller | G06F 21/31 726/4 |

* cited by examiner

CONTROLLING ACCESS BASED ON RECOGNITION OF A USER

BACKGROUND

Recent years have seen drastic increases in the use of portable computing devices, such as smart phones, electronic readers (e-readers) and tablet computers. Today's consumers are utilizing such devices for a wide variety of different purposes, such as to view media content, access and search the Internet, purchase products and services, capture and/or send digital images, compose electronic mail (email) messages, make telephone calls and the like. Such a portable computing device can be used in different locations and by different users. Some of these users may be well-known and authorized users, such as family members, while other users may be strangers or acquaintances and yet other users may be malicious users, such as a thief that has stolen the device. In this context, it is becoming more and more important to control access to the device and to protect the privacy and sensitive information of the owner of the device.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the aforementioned and other deficiencies experienced in conventional approaches for controlling access to functionality or data on a computing device. In particular, various approaches discussed herein enable a computing device, such as a phone or tablet computer, to compute (e.g., estimate) a probability that the user currently using the device matches a profile of an authorized user and to set or change a security level of the computing device based on the computed probability. The security level can be one of many security levels each having a different scope of authorized access to data or functions of the computing device. The computing device may periodically (or continuously) re-compute the probability and change the security level whenever the probability crosses certain predefined thresholds. For example, when the probability that the user is an authorized user is higher than one threshold (e.g., 90% probability), the computing device may switch to a different security level that allows access to more functions and data of the computing device. Similarly, as probability gradually decreases over time (e.g., due to periods of inactivity of the device), the security level can be changed to restrict the user to less access to the functions or data of the device. In various embodiments, the probability that the user matches the profile of an authorized user can be computed based on data captured by a plurality of sensors of the computing device, including but not limited to cameras, microphones, accelerometer, gyroscope, touch sensors, global positioning system (GPS) receivers, among others.

In various embodiments, functions or data may be locked or unlocked depending on the security level that the device is currently operating under. The functions or data that are locked or unlocked can be enforced at the system level or on a per application basis. For example, if the computing device determines that the probability that the user is an authorized user is low, the computing device may switch to a security level that may hide applications with personal data, hide or disable access to content considered private, disable payment mechanisms, lock the interface of the device, hide partial or entire browsing history, hide bookmarks, disable stored passwords (e.g., social media account passwords), hide or disable specific actions inside an application, hide access to bank account or investment information, hide access to a password database, prevent access to cloud storage or otherwise restrict access to portions of the functions or data on the device. Similarly, when the computing device determines that the probability that the user is an authorized user is high enough, the computing device may change the security level to enable the user with access to a portion or all of the functions/data of the computing device, such as email, calendar, payment system information, social networking, browsing history, passwords, bookmarks, personal documents and the like. In at least some embodiments, if access to a particular function or data is disabled by the security level, the user may be given an option to enter a password in order to raise the security level that would allow access to the requested function.

As one possible illustration, if the computing device determines that the probability that the user is an authorized user is less than 50%, the computing device may be operating under security level 4 that enables access to games and basic Internet browsing and disables all other access to private content and functions of the device. The computing device may then periodically re-compute the probability and once the probability rises above 50%, the computing device may switch to a security level 3 that enables access to all of the security level 4 functions and content and additionally enables access to the browsing history and bookmarks on the device. Once the computing device is operating under security level 3, it may continue to periodically re-compute the probability that the user matches a profile of an authorized user. When the computing device detects that the probability has risen above 75%, the computing device may switch to security level 2 which allows access to all of the functions and content as security level 3, and additionally grants access to social networking accounts of the user. Thereafter, the computing device may continue re-computing the probability and once the probability that the user matches an authorized user rises above 90%, the computing device may switch to security level 1 which grants access to all of the functions and data on the device. For example, under security level 1, access to personal documents, access to any cloud storage accounts, payment mechanisms, settings changes and parental control modifications can all be enabled on the computing device. It should be noted that any specific thresholds or numbering of security levels specified in the illustration above are chosen purely for purposes of explanation and should not be construed as limiting to the various embodiments described herein. For example, in various alternative embodiments, the numbering of the security levels may be reversed, there may be fewer or greater number of security levels, the thresholds may be set at different probability values and the like.

In accordance with an embodiment, the probability computation can be performed by a component within an operating system (e.g., within a kernel) based on data gathered by the various sensors of the computing device. For example, the operating system component can perform facial recognition on images captured by a camera of the computing device or voice fingerprinting of sound captured by a microphone of the device in order to compute (e.g., estimate) the probability that the user currently using the device matches a profile of an authorized user. When the probability crosses predefined thresholds, the component of the operating system can issue an event notification to all applications installed on the device, indicating that the security level has been changed. The various applications may then control access to their internal services and content based on the altered security level.

In some embodiments, the user may be given an option to configure their applications and content to be accessible or inaccessible when operating under certain security levels. For example, the user may be given an option to activate a touch screen element corresponding to an application (or service, content, etc.) and to designate that application as being sensitive. If the application is configured to be sensitive, the computing device would provide access to it only when operating under the highest security level. Alternatively, the user may be given an option to configure the specific security level under which the application or service is accessible, such as specifying that the browsing history may be accessible under any security level, while social networking accounts may be accessible only under the highest security level and the like. In various embodiments, a toolkit can be provided to application developers to control access to various portions or services within an application based on the security level that the computing device is operating under.

Figure 1:
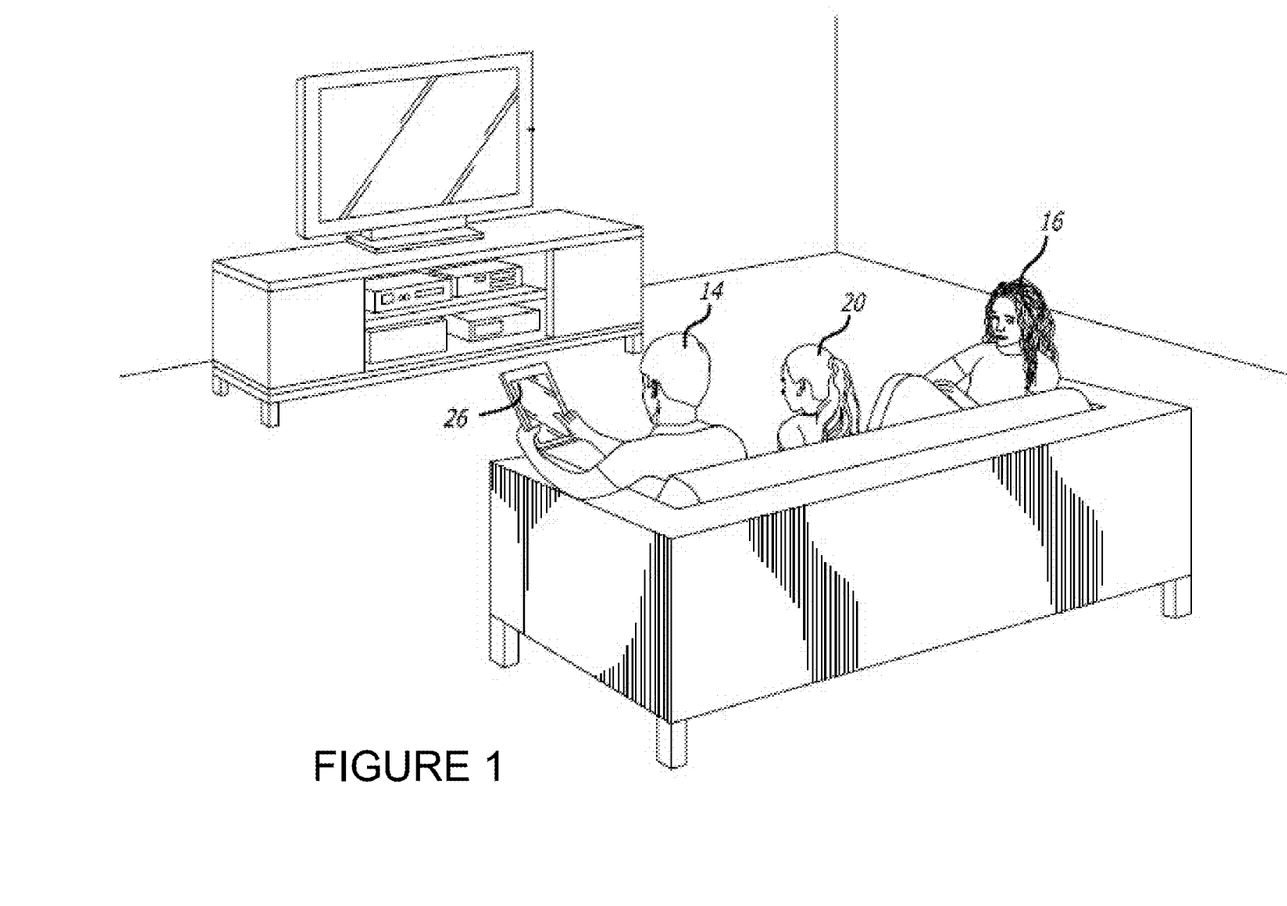
FIG. 1 illustrates an example of an environment in which multiple users may utilize the computing device, in accordance with various embodiments.

FIG. 1 illustrates an example of an environment in which multiple users may utilize the computing device, in accordance with various embodiments. As shown in the illustration, mobile computing devices, such as device 26 are commonly owned by a primary user, but shared on a temporary basis with other users for a wide variety of reasons. For example, the primary user may wish to showing another user some content, let them try a function of the device, get help related to the use of the device, or simply use the device together, such as watching a movie or video. In some cases, however, another user may pick up the mobile computing device 26 without the knowledge or consent of the primary user. For example, a child may pick up the device of a parent, a curious officemate may pick up the device of a colleague or a thief may steal the device from the primary user. Given the increasing reliance users have on mobile devices in recent years, there is likely to be data or functions on the device that the primary owner does not necessarily want readily available to other users (i.e. unauthorized users) of the same physical device. In particular, functions such as electronic mail (email), calendars, payment system information, browsing history, passwords, bookmarks and other personal content (e.g., pictures, written documents, videos) are often regarded as being sensitive and private and therefore the primary user may wish to restrict other users from accessing such functions in at least some manner.

In the illustration shown in FIG. 1, the computing device 26 may store the profiles of several authorized users (14, 20, 16) which in this case are members of a family. In various embodiments, because the computing device 26 can maintain a profile for each known or authorized user of the device and can provide a score or probability that the current user is an authorized user, or not, steps can be taken to protect the authorized user's (e.g., device owner's) privacy. For example, depending on how closely the user matches a stored profile of an authorized user, the computing device may selectively hide calendar appointments or emails, disable payment systems or require payment data to be re-entered first, optionally password the payment systems similar to parental controls, hide potentially private content (e.g., documents, movies, photos, books) or applications, limit access to music or other streaming, restrict access to bookmarks or web history, disable social networking access or other saved passwords and the like.

In some embodiments, the computing device 26 may allow for different behaviors for different users. For example, if the father 14 or mother 16 are using the computing device 26, the computing device may allow the security level to be raised all the way to the highest security level 1 (e.g., assuming the probability is high enough) while if a child 20 using the computing device may be restricted to a maximum of security level 2 (e.g., if security level 1 provided access to adult content, such as in-application payments). In this example, even if the computing device 26 computes that the probability that the user 20 matches the profile of the authorized child within a very high percentage (e.g., 99% probability), the computing device would still continue to operate under security level 2 and never enter security level 1 in order to restrict the child from accessing adult content on the device.

Although the illustration shown in FIG. 1 depicts a portable tablet computer, the computing device is not limited to any particular type of device. In various alternative embodiments, the computing device 26 may be a mobile phone, an electronic reader (e-reader), a digital media player, a personal digital assistant (PDA), a laptop, a wristwatch, a pair of goggles or virtual glasses having processing capabilities, among other such devices.

Figure 2A:
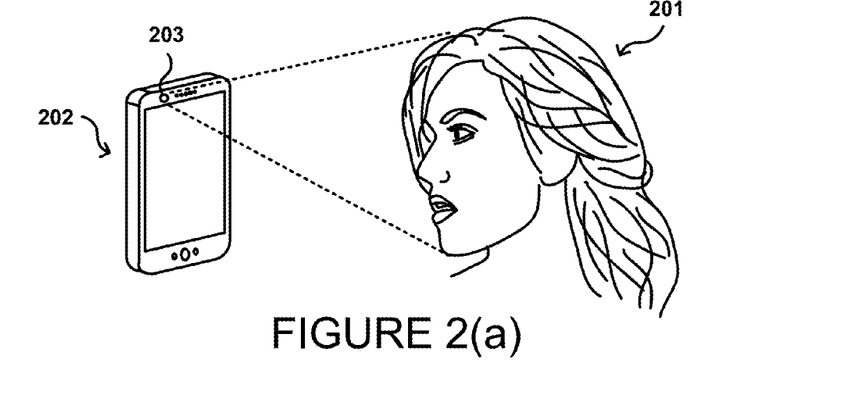
FIGS. 2(a), 2(b), 2(c) and 2(d) illustrate some examples of the various sensors of a computing device that may be used to capture data that is used to compute the probability that the user matches an authorized user, in accordance with various embodiments.

FIGS. 2(a), 2(b), 2(c) and 2(d) illustrate some examples of the various sensors of a computing device that may be used to capture data that is used to compute the probability that the user matches an authorized user, in accordance with various embodiments. FIG. 2(a) shows an illustration of the computing device 202 utilizing at least one camera 203 that is configured to capture one or more images of the user 201 (e.g., user's face or other features). The computing device may then process the images and perform facial recognition to determine the probability that the user 201 matches a profile of an authorized user. For example, the computing device 201 may store a set of feature points associated with each profile and upon processing the image data using facial recognition techniques, compare the feature points of user 201 with the stored set of feature points associated with the profile of an authorized user in order to compute the probability that the user 201 matches the authorized user. Facial recognition systems are well known in the art and are often used for automatically identifying or verifying a person from a digital image or a video frame from a video source.

Figure 2B:
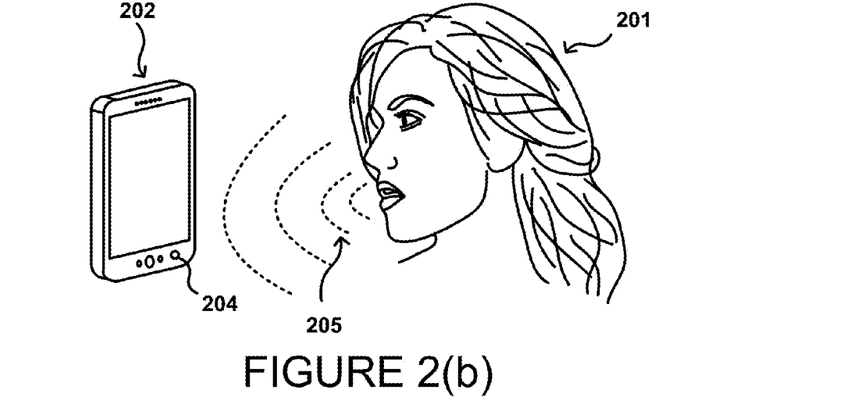

FIG. 2(b) illustrates an example of the computing device 202 utilizing a microphone 204 to capture sound waves 205 produced by the user 201 which can be analyzed to compute the probability that the user 201 matches the stored profile of an authorized user. In one example, the computing device 202 may store a voice fingerprint or other data associated with the voice of the authorized user. When the computing device 202 detects sound being captured by the microphone 204, the computing device 202 may apply one or more voice fingerprinting or speech recognition techniques in order to compute (e.g., estimate) the probability that the voice of the user 201 matches the stored voice fingerprint of the authorized user. Voice fingerprinting can be based on the perceptual characteristics of the audio. For example if two voices would sound alike to the human ear, their acoustic fingerprints should match, even if their binary representations are quite different. A number of voice fingerprinting techniques can be used within the scope of the embodiment shown in FIG. 2(b).

Figure 2C:
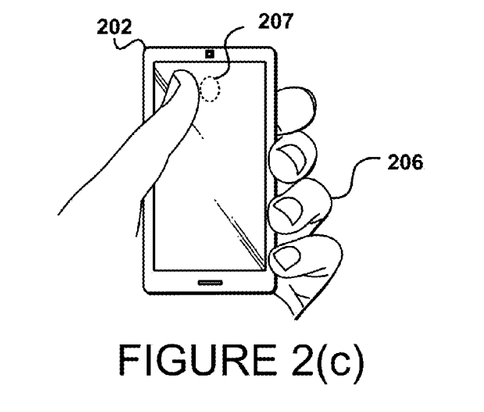

FIG. 2(c) illustrates an example of the computing device 202 utilizing a set of touch sensors of a touch screen 207 to compute a probability that the user matches a profile of an authorized user. In various embodiments, data produced by the touch sensors can be used to compute the probability in a number of different ways. For example, the touch sensors 207 can be used to recognize whether the user is holding the phone left-handed 206 or right-handed and match the determination to the profile stored for the authorized user. Similarly, the computing device may utilize the touch sensors to determine the softness and/or hardness of a tap (or touch) by the user and determine whether the softness or hardness matches the average range of softness or hardness of the authorized user. In various embodiments, mutual capacitance or self-capacitance touch sensors can be utilized within the scope of the example shown in FIG. 2(c).

Figure 2D:
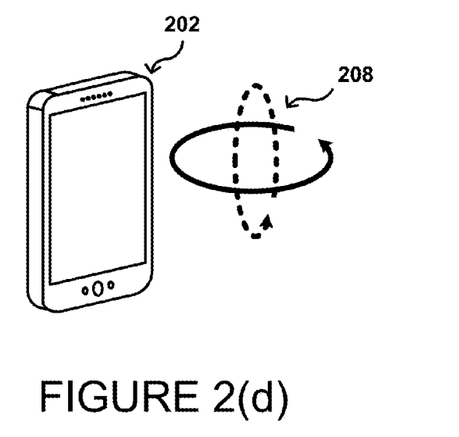

FIG. 2(d) illustrates an example of the computing device 202 utilizing an accelerometer and/or gyroscope to determine the probability that the user matches a stored profile of an authorized user. Accelerometers or gyroscopes are well known in the art and can be used to produce data related to the rotation, movement, gravity and/or proper acceleration 208 of the computing device. For example, the accelerometer may be used to detect the background shake of the user's hand that is holding the device and compare that data to a stored profile of an authorized user in order to compute the probability. Similarly, the accelerometer may be used to detect the angle or tilt of the way the user is holding the computing device and compare that information to the stored profile. Any number of examples of using the accelerometer data may be utilized to compute the probability as well.

It should be noted that although FIGS. 2(a)-2(d) illustrate the use of camera, microphone, touch sensors and accelerometer, the various embodiments described herein are not limited to the use of any specific sensors. For example, in alternative embodiments, the computing device may utilize a global positioning system (GPS) receiver to determine the geographic location of the computing device and compare it to a set of common locations associated with a stored profile of an authorized user. In various embodiments, the computing device 201 may analyze the data gathered by some or all of the sensors in order to determine the probability that the user matches an authorized user. For example, the computing device may assign different weights to probabilities based on the image data, sound data, touch data and orientation data. The device may then compute a total overall probability that the user matches the authorized user based on aggregating the different probabilities, while taking into consideration their weights.

In some embodiments, the computing device may also utilize application level data to perform the probability computation. For example, the computing device may store a set of common actions and/or times of day associated with different applications that the user may use for each profile of an authorized user. For example, if the authorized user typically accesses the news application in the morning and first opens the sports section of the news application, this action/time combination may be stored in the profile of the authorized user along with the application identifier. Subsequently, this application interaction information may be used (in combination with other data, such as sensor data) to compute the probability that the current user of the device matches the authorized user. For example, if a user picks up the device and opens the same news application and sports section, the probability may be increased, and if the user opens another application, the probability may be decreased. Any number of such common actions, times, or content may be maintained as part of the profile of each authorized user.

In some embodiments, the computing device may offload the probability computations to a remote server by providing information gathered about the user of the device over the network to the server. In these embodiments, if the device has a substantial amount of historical data that may be analyzed, the data analysis may be more efficiently performed by a remote server that may be contacted over the network.

Figure 3:
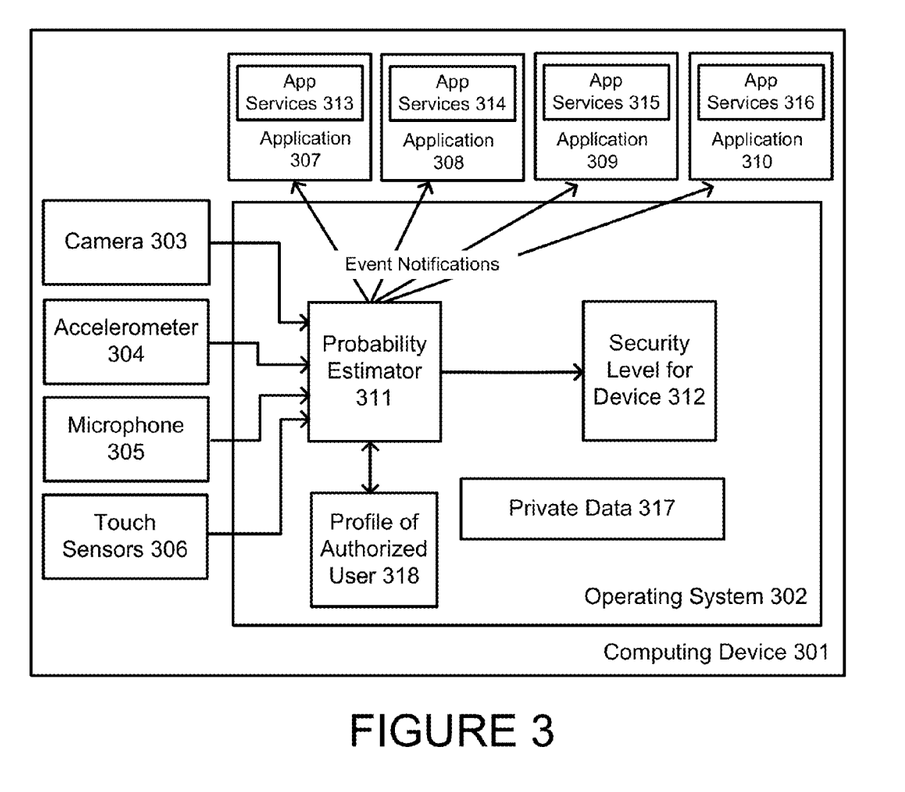
FIG. 3 illustrates an example of various components of a computing device that is capable of selecting a security level based on the probability that the user matches an authorized user, in accordance with various embodiments.

FIG. 3 illustrates an example of various components of a computing device that is capable of selecting a security level based on the probability that the user matches an authorized user, in accordance with various embodiments. As shown in the illustration, the data produced by the various sensors of the computing device, such as the camera 303, accelerometer 304, microphone 305 and touch sensors 306 may be analyzed by a probability estimator 311 (or other component) in the operating system 302 of the computing device 301. Based on the data received from the sensors, the estimator 311 periodically computes a probability of whether the user currently using the computing device 301 matches a stored profile of an authorized user 318. If the probability crosses certain predefined thresholds, the computing device 301 may change the security level 312 of the device. For example, when the probability that the user matches the authorized user is higher than one threshold, the security level 312 may be changed to a different security level that allows access to more functions or private data 317 of the computing device. Additionally, when the security level is changed, an event notification may be generated to all of the applications (307, 308, 309, 310) installed on the computing device, indicating that the security level has been changed and indicating the new security level. The applications installed on the device may then use the information about the new security level to control access to various application services (313, 314, 315, 316) and content. In alternative embodiments, other components that may be lower in the software stack of the device may utilize the security level to control access to various functions and data. For example, a file system abstraction layer may listen to the events indicating that the security level has changed and utilize those events to control access to the files and directories.

In various embodiments, the operating system 302 or other component of the computing device 301 can automatically flag specific data/applications as private, either based on the type of data or based on the location where the data is located on the device. Similarly applications can be flagged based on the information they are accessing (e.g., bank history, social networks). Access to such applications and data can be controlled based on the current security level that the device is operating under.

Alternatively, the computing device 301 can provide the user with a method of configuring the security scale and the actions/content associated with each security level. In some embodiments, there may be default settings provided by the system and the user may be allowed to modify the default settings. One possible way to modify the settings may be to hold a finger pressed over a resource (e.g., document, data, application) where a dialog box pops up, allowing the user can specify that this is sensitive resource. Once the user specifies a particular resource as being sensitive, the computing device may treat that resource as only accessible in the highest security level. Alternatively, the user may explicitly specify the minimum security level for each resource. In various embodiments, different portions/functionality of applications may be controlled according to different levels. For example to access the email client, a user may need security level 2 but to send email or to change the settings of the email client the device may require a security level 1. This functionality may also be integrated with a software development kit (SDK) to enable the application developers to allow the user to modify the security levels, provide options to the user, and the like.

Figure 4:
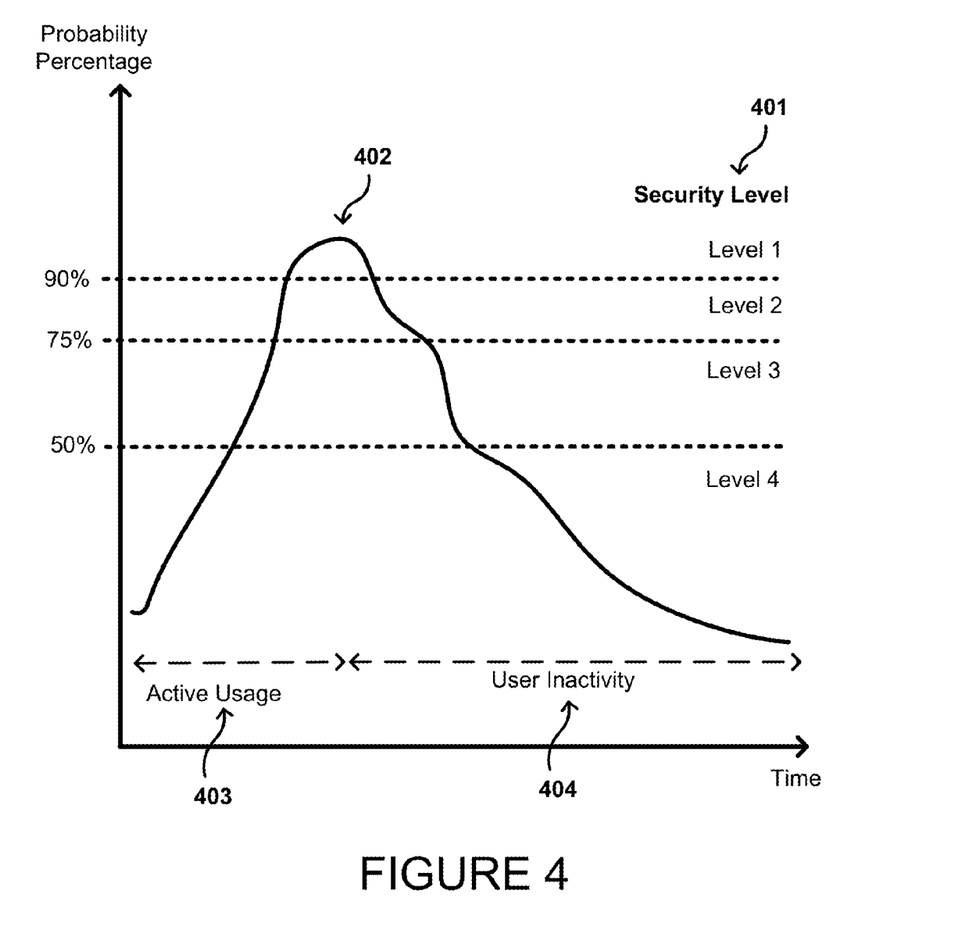
FIG. 4 illustrates an example of a probability and associated security levels that are changing over time, in accordance with various embodiments.

FIG. 4 illustrates an example of a graph showing the probability and associated security levels that are changing over time, in accordance with various embodiments. The graph plots the probability percentage computed by the computing device on the Y axis versus time on the X axis. As a result of periodic (or continuous) re-computation, the probability 402 that the user currently using the device matches a stored profile of an authorized user changes over time. For example, during the time period 403 when the user is actively using the device, the sensors are able to collect data about the user and the probability 402 is increasing (e.g., assuming that the captured data matches the data of the stored profile). During time periods of inactivity, the computing device may apply a time decay function to the probability such that the probability gradually decreases over time due to lack of data about the user. The probability may be low either because the system could not recognize the device owner or because there was not enough data to make a good estimate. The more time is spent with limited or no new data, the more the system can bias towards more restricted access. For example, if the user puts down the computing device and leaves the room after some time, the probability would likely have decreased by the time an unauthorized user picks up the device such that the unauthorized user would not be able to access the more sensitive functions or data on the device.

Similarly an unusual action for the user's profile may decrease the probability and change the security level to a more restricted level. For example, if the computing device detects that the user is accessing content or functionality that is unusual with respect to the profile of the authorized user, the computing device may decrease the probability, as previously described. In cases where the computing device was not able to gather enough data from the sensors, the system could request a password entry to immediately grant the access to the needed security level. This way, if the authorized user picks up the device again after some time has expired and accesses the sensitive data on the device before the device has been able to raise the probability, the authorized user would be able to bump up the probability level by manually entering the password. It should be noted that the term "password" as used throughout this disclosure should be broadly interpreted and is not necessarily limited to a conventional key entry of characters and numbers, as commonly used in the art. In various alternative embodiments, a password may be implemented as a particular preselected swipe pattern entered on the touch screen display of a computing device that is known to the user. Alternatively, a password may be implemented by matching a fingerprint of the authorized user during touch input on the display screen, or by utilizing any other authentication mechanism.

Continuing with the illustration, as the probability gradually increases, the probability may cross the 50% threshold and the computing device may switch from security level 4 to security level 3. Upon switching to the new security level, the computing device may provide access to an additional set of functions and/or data on the device. In addition, the operating system component may issue an event notification to all applications installed on the computing device, notifying the applications that the security level has now changed to security level 3. In the same way, when the probability rises to above the 75% threshold, the computing device may switch to security level 2 and when the probability reaches 90%, the device may switch to security level 1, as previously described. Upon each changing of the security level, the computing device may provide additional access to the various functions and data on the device until the device is made fully accessible in security level 1.

In various embodiments, the threshold to change the security level from level 1 to level 2 may be different from the threshold to change from level 2 to level 1. This can be done to ensure that the security level does not continue switching rapidly between the two levels when the probability level is remaining very close to the threshold value. For example, in various embodiments, the probability threshold to switch from security level 2 to level 1 can be set at 90%, while probability threshold to switch from level 1 back to level 2 can be set at 85% or 80%. Using these threshold values, if the probability stays in the range of 88% to 92%, the device would continue operating at security level 1, without switching back to level 2.

Figure 5:
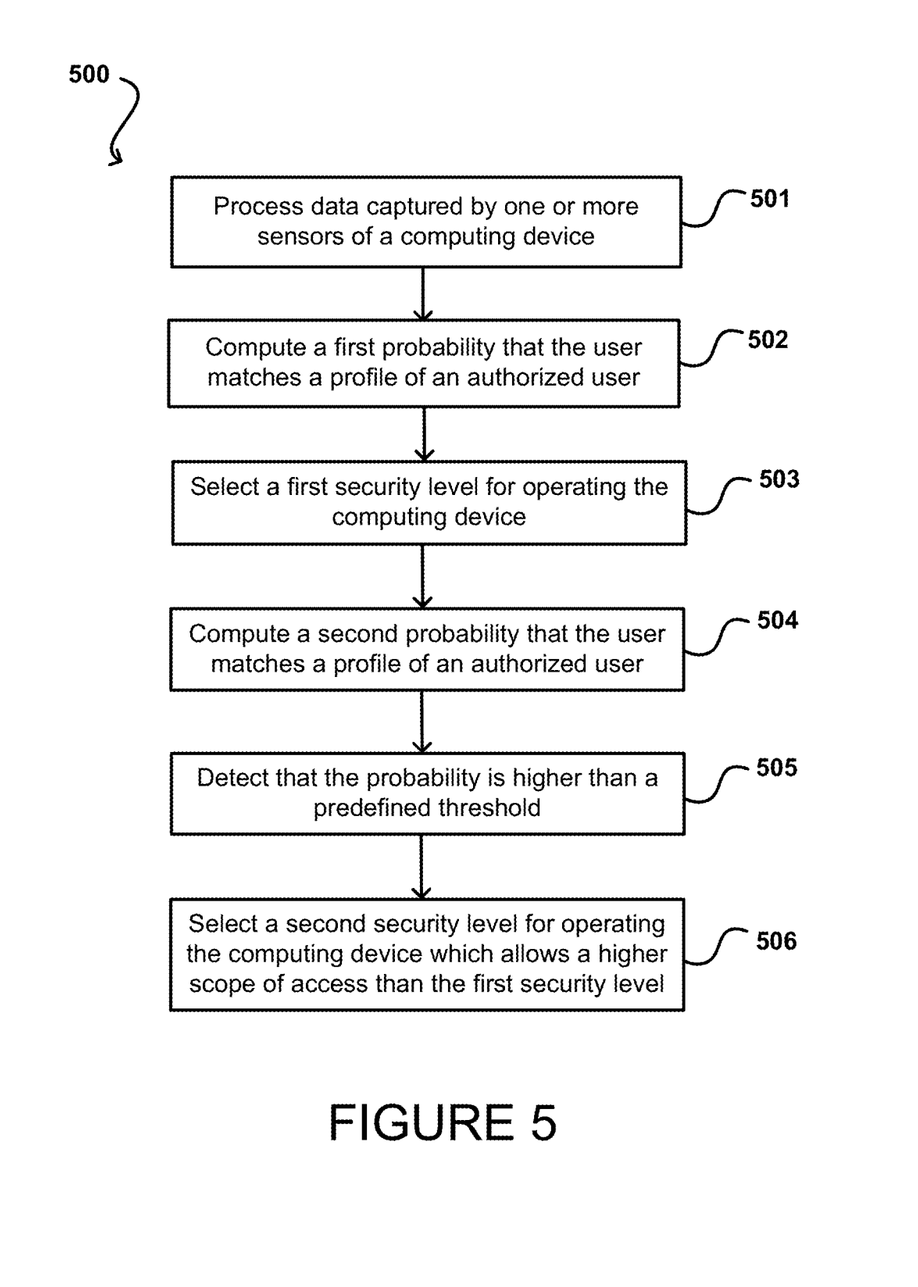
FIG. 5 illustrates an example of a process for controlling access to a computing device based on a probability that the user matches an authorized user of the computing device, in accordance with various embodiments.

FIG. 5 illustrates an example of a process 500 for controlling access to a computing device based on a probability that the user matches an authorized user of the computing device, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 501, the computing device may process the data captured by one or more sensors of the device. For example, the computing device may process image data, sound data (e.g., audio), accelerometer data, gyroscope data, touch data and the like. In operation 502, the computing device computes a first probability of whether the user matches a profile of an authorized user based at least in part on the data received from the sensors. The computing device may store a profile for each authorized user of the device. The profile may contain information about the facial features of the authorized user, the voice fingerprint of the authorized user, a list of common actions performed at specific times of day by the authorized user, touch information about the authorized user (e.g., whether the user is left handed or right handed, etc.), a list of common geographic locations associated with the user and the like. The computing device may compare the data being captured by the sensors to the data stored in the profile in order to compute the probability that the user matches the authorized user of the device.

In operation 503, the computing device selects a first security level based on the probability that the user matches the authorized user. The computing device may continue to operate under the first security level and re-compute the probability at periodic time intervals (e.g., every 3 seconds). In operation 504, the computing device computes a second probability of whether the user matches the authorized user of the device.

Each time the computing device re-computes the probability, the device may compare the new probability to the nearest defined thresholds in order to determine whether to change the security level of the device. For example, in operation 505, the computing device detects that the probability is higher than a predefined threshold. In operation 506, the computing device then selects a second security level in response to detecting that the probability has risen above the predefined threshold. For example, the computing device may detect that the probability that the user matches the authorized user now exceeds 90% and switch to the security level with the highest level of access to the functions of the device. In addition, when switching to a new security level, the operating system of the computing device may transmit an event notification to all applications installed on the device, notifying them of the switch to the new security level.

Figure 6:
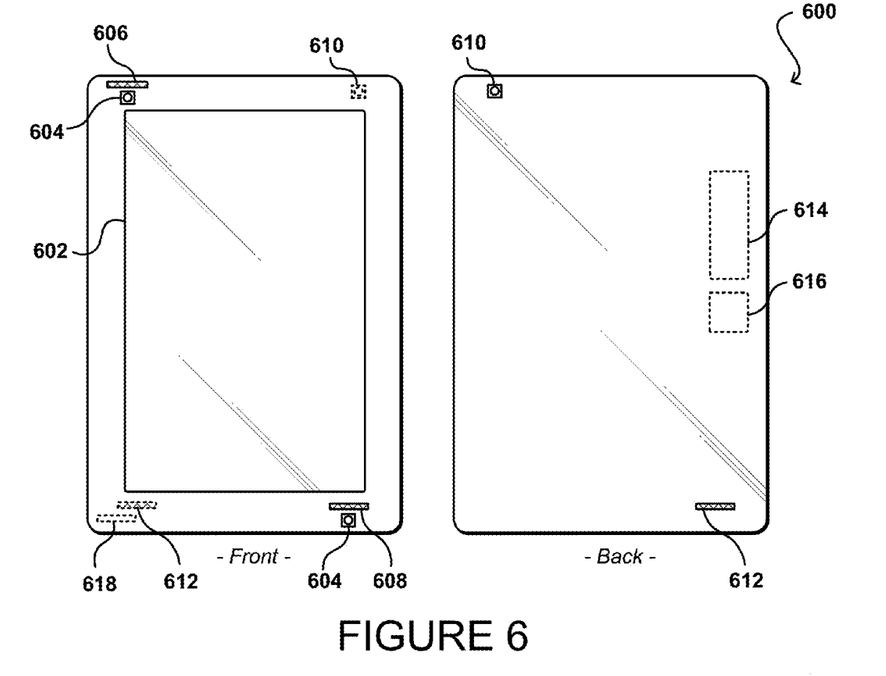
FIG. 6 illustrates front and back views of an example portable computing device that can be used in accordance with various embodiments.

FIG. 6 illustrates front and back views of an example client computing device 600 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others. The client device may have an associated browser width, browser height, as well as various other client-side information associated therewith.

In this example, the portable computing device 600 has a display screen 602 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 610 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the portable computing device in this example includes one image capture element 604 on the "front" of the device and one image capture element 610 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least one microphone 606 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 600 in this example also includes at least one motion or position determining element operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 614, such as may include at least one wired or wireless component operable to communicate with one or more portable computing devices. The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

Figure 7:
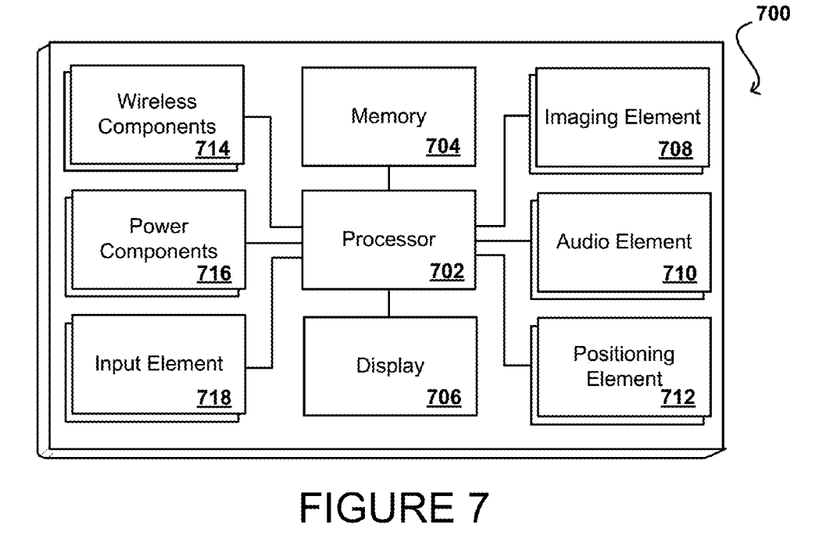
FIG. 7 illustrates an example set of basic components of a portable computing device, such as the device described with respect to FIG. 6.

In order to provide functionality such as that described with respect to FIG. 6, FIG. 7 illustrates an example set of basic components of a portable computing device 700, such as the device 600 described with respect to FIG. 6. In this example, the device includes at least one processor 702 for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc.

The device typically will include some type of display element 706, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 708, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device.

The device, in many embodiments, will include at least one audio element 710, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one positioning element 712 that provides information such as a position, direction, motion, or orientation of the device. This positioning element 712 can include, for example, accelerometers, inertial sensors, electronic gyroscopes, electronic compasses, and GPS elements.

The device can include at least one additional input device 718 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 714 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 716 known in the art for providing power to a portable computing device, which can include capacitive charging elements for use with a power pad or similar device as discussed elsewhere herein. The example device also can include at least one touch and/or pressure sensitive element 718, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

Figure 8:
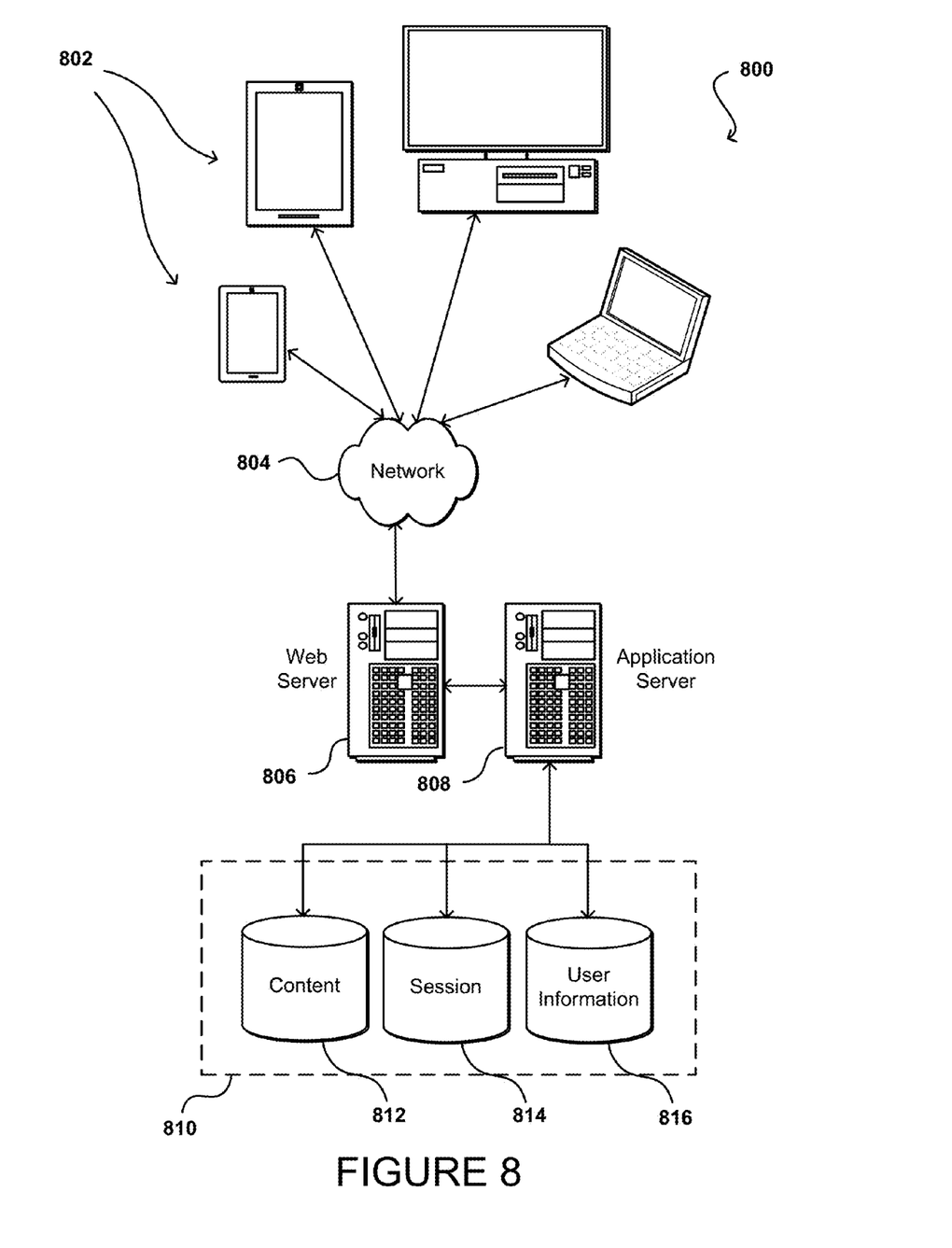
FIG. 8 illustrates an example of an environment for implementing aspects in accordance with various embodiments.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
a camera configured to capture image data;
at least one processor; and
memory including instructions that, when executed by the at least one processor, cause the computing device to:
determine first user inactivity data, based at least in part on inactivity of the computing device during a first period of time;
analyze first data, including at least first image data, the first user inactivity data, and first non-image data obtained at a first time, to compute a first probability that the first data matches a profile of an authorized user of the computing device;
operate the computing device under a first security level for controlling access to one or more functions or data on the computing device, the first security level selected based at least in part on the first probability;
determine second user inactivity data, based at least in part on inactivity of the computing device during a second period of time;
analyze second data, including at least second image data, the second user inactivity data, and second non-image data obtained at a second time, to compute a second probability that the second data matches the profile of the authorized user of the computing device;
determine that the second probability is higher than a defined threshold;
switch to operate the computing device under a second security level, the second security level granting the user access to more functions or data on the computing device than the first security level; and
generate an event notification to one or more applications installed on the computing device, the event notification indicating the switch to the second security level.

2. The computing device of claim 1, further comprising at least one of:
an accelerometer operable to provide gravitational data, wherein the gravitational data is analyzed to compute the first probability or the second probability;
a microphone operable to capture audio data wherein the audio data is analyzed to compute the first probability or the second probability; or
touch sensors operable to detect touch input data, wherein the touch input data is analyzed to compute the first probability or the second probability.

3. The computing device of claim 1, wherein the one or more functions or data on the computing device further include at least one of:
electronic mail (email) functions, calendar functions, electronic payment information, browsing history information, one or more passwords, bookmark information, one or more pictures, one or more documents or video.

4. The computing device of claim 1, wherein the memory includes instructions that, when executed by the at least one processor, cause the computing device to:
detect a time period of inactivity of the computing device based at least in part on data captured by one or more sensors; and
compute a third probability that third data, including third image data and third non-image data, matches the profile of the authorized user that is lower than the second probability based at least in part on the time period of inactivity.

5. A computer implemented method, comprising:
under the control of one or more computer systems configured with executable instructions,
determining user inactivity data, based at least in part on inactivity of a computing device during a first period of time;
processing image data, the user inactivity data, and non-image data captured by one or more sensors of the computing device or obtained from one or more applications installed on the computing device, the image data and the non-image data associated with a user of the computing device;
computing a probability that the user matches an authorized user of the computing device based at least in part on the image data, the user inactivity data, and the non-image data captured by the one or more sensors;
selecting a security level from a plurality of different security levels for operating the computing device based at least in part on the probability that the user matches the authorized user, each security level associated with a different scope of authorized access to functions or data of the computing device; and
operating the computing device using the selected security level to control access to the functions or data of the computing device.

6. The computer implemented method of claim 5, further comprising:
periodically re-computing the probability that the user matches the authorized user of the computing device based at least in part on the data captured by the one or more sensors during one or more subsequent time periods.

7. The computer implemented method of claim 6, further comprising:
determining that the re-computed probability is higher than a defined threshold; and
selecting a second security level from the plurality of different security levels with a higher scope of authorized access to the functions or data of the computing device than the security level.

8. The computer implemented method of claim 6, further comprising:
determining that the re-computed probability is lower than a defined threshold; and
selecting a second security level from the plurality of different security levels with a lower scope of authorized access to the functions or data of the computing device than the security level.

9. The computer implemented method of claim 5, further comprising:
providing an interface that enables a user to configure a scope of authorized access associated with each security level of the plurality of different security levels.

10. The computer implemented method of claim 9, wherein the interface is capable of assigning to a profile of the authorized user a maximum limit for the security level that can be granted to the user matching the profile.

11. The computer implemented method of claim 10, wherein the one or more applications are configured to control user access to internal application services based at least in part on the selected security level.

12. The computer implemented method of claim 5, wherein the probability is computed by a component of an operating system of the computing device, the component configured to generate an event notification to the one or more applications installed on the computing device, the event notification indicating the selected security level.

13. The computer implemented method of claim 5, wherein computing the probability further comprises:

in response to detecting that the computing device has remained inactive for a predetermined time interval, decreasing the probability that the user is the authorized user based at least in part on the predetermined time interval.

14. The computer implemented method of claim 5, further comprising:

receiving a request to access the functions or data of the computing device from the user;

determining that the selected security level does not permit the request to access the functions or data; and requiring the user to enter a password prior to providing access to the functions or data of the computing device.

15. A non-transitory computer readable storage medium storing one or more sequences of instructions that, when executed by one or more processors, cause a computing system to:

determine user inactivity usage data, based at least in part on inactivity of the computing system during a first period of time;

process image data, the user inactivity usage data, and non-image data captured by one or more sensors of a computing device or obtained from one or more applications installed on the computing device, the image data and the non-image data associated with a user of the computing device;

compute a probability that the user matches an authorized user of the computing device based at least in part on the image data, the user inactivity usage data, and the non-image data captured by the one or more sensors;

select a security level from a plurality of different security levels for operating the computing device based at least in part on the probability that the user matches the authorized user, each security level associated with a different scope of authorized access to functions or data of the computing device; and operate the computing device using the selected security level to control access to the functions or data of the computing device.

16. The non-transitory computer readable storage medium of claim 15, further comprising instructions that, when executed by one or more processors, cause the computing system to:

periodically re-compute the probability that the user matches the authorized user of the computing device based at least in part on the data captured by the one or more sensors during one or more subsequent time periods.

17. The non-transitory computer readable storage medium of claim 16, further comprising instructions that, when executed by one or more processors, cause the computing system to:

determine that the re-computed probability is higher than a defined threshold; and select a second security level from the plurality of different security levels with a higher scope of authorized access to the functions or data of the computing device than the security level.

18. The non-transitory computer readable storage medium of claim 16, further comprising instructions that, when executed by one or more processors, cause the computing system to:

determine that the re-computed probability is lower than a defined threshold; and select a second security level from the plurality of different security levels with a lower scope of authorized access to the functions or data of the computing device than the security level.

19. The non-transitory computer readable storage medium of claim 15, further comprising instructions that, when executed by one or more processors, cause the computing system to:

provide an interface that enables a user to configure a scope of authorized access associated with each security level of the plurality of different security levels.

20. The non-transitory computer readable storage medium of claim 15, wherein the probability is computed by a component of an operating system of the computing device, the component configured to generate an event notification to the one or more applications installed on the computing device, the event notification indicating the selected security level.

21. The non-transitory computer readable storage medium of claim 15, wherein the one or more applications are configured to control user access to internal application services based at least in part on the selected security level.

* * * * *